(12) United States Patent
Baek

(10) Patent No.: US 8,560,744 B2
(45) Date of Patent: Oct. 15, 2013

(54) INPUT INTERFACE PROVIDING USB APPARATUS AND INTERFACE PROVIDING METHOD

(75) Inventor: Joon Hyun Baek, Seongnam-si (KR)

(73) Assignee: Zaramtechnology Co., Ltd. (KR)

( * ) Notice: Subject to any disclaimer, the term of this patent is extended or adjusted under 35 U.S.C. 154(b) by 131 days.

(21) Appl. No.: 13/291,827

(22) Filed: Nov. 8, 2011

(65) Prior Publication Data

US 2012/0233365 A1  Sep. 13, 2012

(30) Foreign Application Priority Data

Mar. 9, 2011  (KR) .................. 10-2011-0021065

(51) Int. Cl.
 *G06F 13/12* (2006.01)
(52) U.S. Cl.
 USPC .............. 710/72; 710/8; 710/11; 710/73
(58) Field of Classification Search
 None
 See application file for complete search history.

(56) References Cited

U.S. PATENT DOCUMENTS

| | | | |
|---|---|---|---|
| 2005/0027918 A1* | 2/2005 | Govindarajulu et al. | 710/313 |
| 2006/0268329 A1* | 11/2006 | Lo | 358/1.15 |
| 2007/0287493 A1* | 12/2007 | Stephens | 455/550.1 |
| 2011/0098000 A1* | 4/2011 | Morris | 455/41.2 |
| 2011/0112819 A1* | 5/2011 | Shirai et al. | 703/21 |
| 2011/0167175 A1* | 7/2011 | Chang | 709/250 |

FOREIGN PATENT DOCUMENTS

| | | |
|---|---|---|
| JP | 2009-060163 | 3/2009 |
| JP | 2010-064823 | 3/2010 |

* cited by examiner

*Primary Examiner* — Ilwoo Park
(74) *Attorney, Agent, or Firm* — John K. Park; Park Law Firm

(57) ABSTRACT

The present invention relates to an input interface providing USB apparatus which is capable of providing an input interface for a variety of external devices in Bluetooth communication with the USB apparatus without a separate input means by connecting the USB apparatus to USB ports of a terminal and sharing an input means of the terminal with the external devices, and an interface providing method. The input interface providing USB apparatus and method in accordance with the present invention is capable of providing an input interface for a variety of external devices in Bluetooth communication with the USB apparatus without a separate input means by connecting the USB apparatus to USB ports of a terminal and sharing an input means of the terminal with the external devices, thereby providing excellent user convenience.

16 Claims, 8 Drawing Sheets

INPUT INTERFACE PROVIDING USB APPARATUS AND INTERFACE PROVIDING METHOD

CROSS-REFERENCE TO RELATED APPLICATION

This application claims the benefit of Korean Application No. 10-2011-0021065, filed on Mar. 9, 2011, with the Korean Intellectual Property Office, the disclosure of which is incorporated herein by reference.

BACKGROUND OF THE INVENTION

1. Field of the Invention

The present invention relates to an input interface providing USB apparatus and an interface providing method, and more particularly, to an input interface providing USB apparatus which is capable of providing an input interface for a variety of external devices in Bluetooth communication with the USB apparatus without a separate input means by connecting the USB apparatus to USB ports of a terminal and sharing an input means of the terminal with the external devices, and an interface providing method.

2. Description of the Related Art

With advance of wireless communication technologies, portable devices with a variety of wireless communication technologies have been actively used.

As one example of wireless communication standards, Bluetooth refers to a local area wireless networking technical standard for connecting and controlling a variety of electronic information and communication devices within a short distance (radius of about 10 to 100 m) by wireless using a 2.45 GHz frequency.

Bluetooth may be used to exchange data between information communication devices such as computers, printers, mobile phones, personal digital assistants (PDAs) as well as various digital home appliances equipped in homes and offices.

In addition, wired networks of almost all home appliances, such as digital cameras, printers and so on, which are capable of wireless data communication and are equipped with Bluetooth functions, can be replaced with wireless networks without requiring cable connection.

Most of recent portable devices such as smart phones and tablet PCs incorporate such Bluetooth functions to allow smooth information exchange in a short distance.

For example, in many cases, a Bluetooth headphone is connected to a smart phone to listen to music or a Bluetooth hands-free is connected to a smart phone to make a call.

In addition, in recent years, as smart phones and tablet PCs have been more frequently used and shared more information than traditional personal computers, users more often than not input or stores information in smart phones or tablet PCs directly.

Smart phones or tablet PCs provide a writing function by incorporating word processing software or memo pads as applications to meet such users' need.

Users may use such word processing software or memo pads to write an important promise or a simple note and transmit it to an acquaintance directly.

A qwerty keyboard or a touch screen is a common input means of smart phones and tablet PCs for word processing.

However, such a qwerty keyboard or touch screen is poor in terms of user convenience and input speed due to its limited size and accordingly has been limited to simple short messages and text messages.

In recent years, in order to alleviate such inconvenience, wireless smart phone keyboards using Bluetooth communication have been released to help users to write documents easily.

However, this also has a disadvantage of poor portability since users have to carry both of a portable device, such as a smart phone, and a wireless smart phone keyboard.

Accordingly, there is a need of a device which can be utilized as an input means with high portability when users carry a smart phone or a tablet PC.

SUMMARY OF THE INVENTION

Accordingly, it is an object of the present invention to provide an input interface providing USB apparatus which is capable of providing an input interface for a variety of external devices in Bluetooth communication with the USB apparatus without a separate input means by connecting the USB apparatus to USB ports of a terminal and sharing an input means of the terminal with the external devices, and an interface providing method.

It is another object of the present invention to provide an input interface providing USB apparatus which is capable of sharing an input means irrespective of the kind of a terminal or an external device by separating an USB controller connected to the terminal from a Bluetooth communication unit communicating with the external device, and an interface providing method.

It is still another object of the present invention to provide an input interface providing USB apparatus which is capable of being widely used for a variety of operating systems by complying with an USB HID standard and being connected to an USB port of a terminal so that the terminal can recognize the USB apparatus as a HID compliance device, and an interface providing method.

It is still another object of the present invention to provide an input interface providing USB apparatus which is capable of providing a simple input interface without requiring a separate driver by incorporating an execution program which operates in a terminal to allow input data of the terminal to be transmitted to the USB apparatus, and an interface providing method.

It is still another object of the present invention to provide an input interface providing USB apparatus which is capable of enabling immediate interlock with an external device without installing a separate application in the external device by causing the USB apparatus to communicate with the external device according to a Bluetooth HID standard to allow the external device to recognize the USB apparatus as a standard Bluetooth input means, and an interface providing method.

It is still another object of the present invention to provide an input interface providing USB apparatus which is capable of interfacing basic input means such a keyboard and a mouse and other input means such as a pen, a digitizer and so on by changing the kind of an input interface by only change of set-up of the kind of input means or change of set-up of Bluetooth communication profiles through the above-described separation configuration, and an interface providing method.

To achieve the above objects, according to an aspect of the invention, there is provided an input interface providing USB apparatus including: an USB connector which is connected to a terminal having an USB port and an input device; a device recognition unit which is set to comply with a HID standard and allows the USB apparatus to be recognized as a HID compliance device by the terminal when the USB apparatus is connected to the USB port; a Bluetooth communication unit which is recognized as a standard Bluetooth input device by an external device supporting a Bluetooth device and conducts Bluetooth communication with the external device; a memory unit which stores an execution program which is executed in the terminal, receives data of an input device of the terminal corresponding to the kind of the standard Bluetooth input device, converts the input data into a protocol format according to the HID standard, and transmits the converted input data to the device recognition unit; a data generation unit which receives input device data in the format of HID standard protocol from the device recognition unit, analyzes the input device data according to a format set depending on the kind of the input device, and generates data such that the analyzed data corresponds to a protocol of the standard Bluetooth input device; a controller which transmits the data generated by the data generation unit 115 to the Bluetooth communication unit; and a profile storage unit which stores Bluetooth profiles for Bluetooth input devices of the external device so that the Bluetooth communication unit can be recognized as the standard Bluetooth input device by the external device.

Preferably, the device recognition unit complies with the HID standard and receives data having a data structure set depending on the kind of the standard Bluetooth input device from the execution program.

Preferably, the Bluetooth communication unit is recognized as a standard Bluetooth HID input device by an external device supporting a Bluetooth HID device and conducts Bluetooth communication with the external device.

Preferably, the device recognition unit provides an input interface further including receiving mouse pointer data in the terminal from the execution program.

Preferably, the device recognition unit receives copied input data from the execution program if a pointer in the terminal is beyond a preset threshold or is moved to a preset position.

Preferably, the memory unit is implemented with a readable/writable memory to allow the execution program to be updated.

Preferably, the memory unit stores a plurality of execution programs depending on the kind of operating system of the terminal.

Preferably, the external device is one of a smart phone, a tablet PC and a notebook PC and an operating system of the external device is one of Android OS, iOS, Windows OS, Symbian OS, Blackberry OS and Bada OS.

Preferably, the device recognition unit further includes an USB hub for simultaneous recognition of the memory unit and the HID compliance device in the terminal.

According to another aspect of the invention, there is provided an input interface providing USB apparatus connected to a terminal via an USB port, including: a Bluetooth communication unit which is recognized as a standard Bluetooth input device by an external device supporting a Bluetooth device and conducts Bluetooth communication with the external device; and an USB controller 110 which is set to comply with a HID standard, is recognized as an HID compliance device by the terminal when the USB controller is connected to the USB port, receives data of an input device of the terminal corresponding to the kind of the standard Bluetooth input device through an execution program which is executed in the terminal and converts the input data into a protocol format according to the HID standard, analyzes the received input data according to a format set depending on the kind of the input device, generates data such that the analyzed input data corresponds to a protocol of the standard Bluetooth input device, and transmits the generated data to the Bluetooth communication unit.

According to still another aspect of the invention, there is provided an input interface providing USB apparatus connected to a terminal via an USB port, including: a device recognition unit which is set to comply with a HID standard and allows the USB apparatus to be recognized as a HID compliance device by a terminal when the USB apparatus is connected to the USB port; a Bluetooth communication unit which is recognized as a standard Bluetooth keyboard by an external device and conducts Bluetooth communication with the external device; a program storage unit which stores an execution program which is executed in the terminal, receives keyboard data of the terminal, converts the keyboard data into a protocol format according to the HID standard, and transmits the converted keyboard data to the device recognition unit; a data analysis unit which analyzes the keyboard data from the device recognition unit according to a set format; a data generation unit which generates data such that the data analyzed by the data analysis unit corresponds to a protocol of the standard Bluetooth keyboard; and a controller which transmits the data generated by the data generation unit to the Bluetooth communication unit.

According to still another aspect of the invention, there is provided an input interface providing USB apparatus including: an USB connector which is connected to a terminal having an USB port and an input device; a device recognition unit which is set to comply with a HID standard and allows the USB apparatus to be recognized as a HID compliance device by the terminal when the USB apparatus is connected to the USB port; a memory unit which stores an execution program which is executed in the terminal, receives the kind of an input device of the terminal, receives input data corresponding to the input device, converts the received input data into a standard protocol format according to the HID standard, and transmits the converted input data to the device recognition unit; a profile storage unit which stores Bluetooth profiles for one or more Bluetooth input devices of one or more external devices supporting a Bluetooth device; a Bluetooth communication unit which selects a Bluetooth profile corresponding to the input device from the Bluetooth profiles and conducts Bluetooth communication with the external device while causing the external device to be recognized as the selected Bluetooth input device; a data analysis unit which analyzes the input data from the device recognition unit according to a format set depending on the kind of the set input device; a data generation unit which generates data such that the data analyzed by the data analysis unit corresponds to a protocol of the selected Bluetooth profile; and a controller which transmits the data generated by the data generation unit to the Bluetooth communication unit.

Preferably, the profile storage unit may add, delete and update the Bluetooth profiles and the memory unit may add, delete and update the execution program.

According to still another aspect of the invention, there is provided an input interface providing USB apparatus including: an USB connector which is connected to a terminal having an USB port and an input device; a device recognition unit which is set to comply with a HID standard and allows the USB apparatus to be recognized as a HID compliance device by the terminal when the USB apparatus is connected to the USB port; a profile storage unit which stores Bluetooth profiles for one or more Bluetooth input devices of one or more external devices supporting a Bluetooth device; a Bluetooth communication unit which selects one of the Bluetooth profiles and conducts Bluetooth communication with the external device after the external device is recognized as the selected Bluetooth input device; an input interface setting unit which sets the kind of the Bluetooth input device and designates a Bluetooth profile to be selected by the Bluetooth communication unit; a memory unit which stores an execution program which is executed in the terminal, receives data of an input device of the terminal corresponding to the kind of the input device, converts the input data into a standard protocol format according to the HID standard, and transmits the converted input data to the device recognition unit; a data analysis unit which analyzes the input data from the device recognition unit according to a format set depending on the kind of the set input device; a data generation unit which generates data such that the data analyzed by the data analysis unit corresponds to a protocol of the selected Bluetooth profile; and a controller which transmits the data generated by the data generation unit 115 to the Bluetooth communication unit.

According to still another aspect of the invention, there is provided an input interface providing method of an USB apparatus connected to a terminal via an USB port, including the steps of: setting the USB apparatus to comply with a HID standard and allowing the USB apparatus to be recognized as a HID compliance device by the terminal when the USB apparatus is connected to the USB port; by the USB apparatus driving an execution program to be executed in the terminal; recognizing the USB apparatus as a standard Bluetooth input device by an external device supporting a Bluetooth device and by the USB apparatus conducting Bluetooth communication with the external device; by the USB apparatus receiving data of an input device of the terminal corresponding to the kind of the standard Bluetooth input device, with the input data being converted into a protocol format according to the HID standard, from the execution program; by the USB apparatus analyzing the input data according to a format set depending on the kind of the input device; by the USB apparatus generating data such that the analyzed data corresponds to a protocol of the standard Bluetooth input device; and by the USB apparatus transmitting the generated data to the external device.

According to still another aspect of the invention, there is provided an input interface providing method of an USB apparatus connected to a terminal via an USB port, including the steps of: setting the USB apparatus to comply with a HID standard and allowing the USB apparatus to be recognized as a HID compliance device by the terminal when the USB apparatus is connected to the USB port; by the USB apparatus driving an execution program to be executed in the terminal and receiving the kind of input device of the terminal from the execution program; by the USB apparatus selecting a Bluetooth profile corresponding to the kind of the input device from pre-stored Bluetooth profiles and conducting Bluetooth communication with the external device while causing an external device to be recognized as the selected Bluetooth input device; by the USB apparatus receiving data of an input device of the terminal corresponding to the kind of the input device, with the input data being converted into a protocol format according to the HID standard, from the execution program; by the USB apparatus analyzing the input data according to a format set depending on the kind of the input device; by the USB apparatus generating data such that the analyzed data corresponds to a protocol of the standard Bluetooth input device; and by the USB apparatus transmitting the generated data to the external device.

According to an embodiment of the present invention, an input interface providing USB apparatus and method is capable of providing an input interface for a variety of external devices in Bluetooth communication with the USB apparatus without a separate input means by connecting the USB apparatus to USB ports of a terminal and sharing an input means of the terminal with the external devices, thereby providing excellent user convenience.

According to an embodiment of the present invention, an input interface providing USB apparatus and method is capable of sharing an input means irrespective of the kind of a terminal or an external device by separating an USB controller connected to the terminal from a Bluetooth communication unit communicating with the external device, thereby providing excellent device compatibility.

According to an embodiment of the present invention, an input interface providing USB apparatus and method is capable of being widely used for a variety of operating systems by complying with an USB HID standard and being connected to an USB port of a terminal so that the terminal can recognize the USB apparatus as a HID compliance device, thereby providing increased device compatibility.

According to an embodiment of the present invention, an input interface providing USB apparatus and method is capable of providing a simple input interface without requiring a separate driver by incorporating an execution program which operates in a terminal to allow input data of the terminal to be transmitted to the USB apparatus, thereby providing more increased device compatibility.

According to an embodiment of the present invention, an input interface providing USB apparatus and method is capable of enabling immediate interlock with an external device without installing a separate application in the external device by causing the USB apparatus to communicate with the external device according to a Bluetooth HID standard to allow the external device to recognize the USB apparatus as a standard Bluetooth input means, thereby providing more increased user convenience.

According to an embodiment of the present invention, an input interface providing USB apparatus and method is capable of interfacing basic input means such a keyboard and a mouse and other input means such as a pen, a digitizer and so on by changing the kind of an input interface by only change of set-up of the kind of input means or change of set-up of Bluetooth communication profiles through the above-described separation configuration, thereby providing excellent device scalability.

BRIEF DESCRIPTION OF THE DRAWINGS

The above and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENT

Preferred embodiments of the present invention will be now described with reference to the accompanying drawings.

Figure 1:
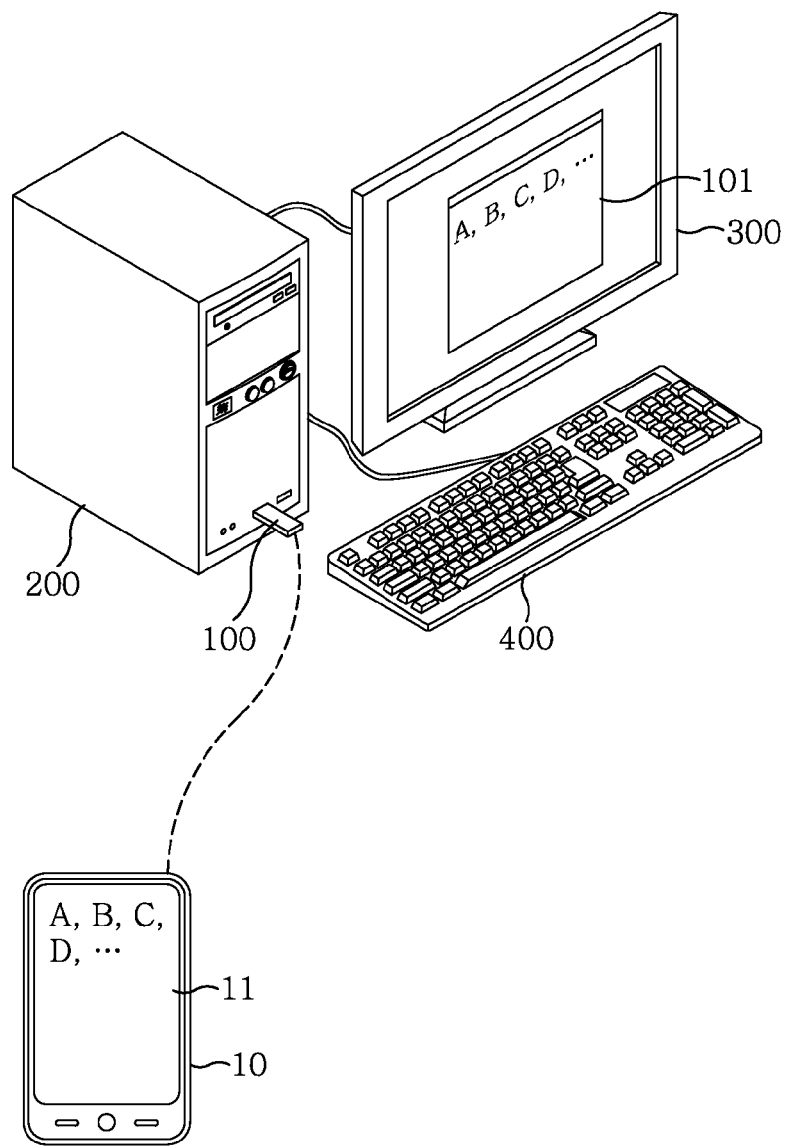
FIG. 1 is a view showing one example of an USB apparatus providing an input interface according to an embodiment of the present invention.

FIG. 1 is a view showing one example of an USB apparatus 100 providing an input interface according to an embodiment of the present invention.

Referring to FIG. 1, when the input interface providing USB apparatus 100 is inserted in an USB port of a computer 200 and an execution program 101 installed in the USB apparatus 100 is executed, a keyboard or a mouse of the computer 200 can be used to input 11 information in a smart phone 10.

In more detail, when the execution program 101 installed in the USB apparatus 100 is executed, a word processing program 101 (or a dedicated word processing program of the USB apparatus) such as a note pad is opened on a screen of a monitor 300 and information input therein is equally input 11 in the smart phone 10.

In addition, when other document contents of the computer 200 are copied and pasted into the word processing program 101 using a Copy & Paste support function, the copied data are transmitted 11 to the smart phone 10.

For example, when a mouse is moved to the smart phone 10, if the mouse is beyond a threshold (for example a left end) of the monitor 300, the mouse may be located near the smart phone 10 so that contents input through a keyboard 400 connected to the computer 200 can be directly input into the smart phone 10, which will be described in more detail with reference to FIG. 2.

The input interface providing USB apparatus 100 includes a Bluetooth communication unit and an USB controller incorporating a memory in which an execution file (for example the above-mentioned execution program 101) is stored.

The memory is preferably a readable/writable memory such as a flash memory to allow the execution program to be updated in the computer 200 but it may be more cost-effective for a ROM (Read Only Memory) to store the execution program.

That is, the USB apparatus is composed of the Bluetooth communication unit and the USE memory and the execution program 101 required for the computer 200 is located in the USB memory.

In this embodiment, the execution program 101 is preferably composed of a single execution file not required to be separately installed.

Since the computer 200 conducts no direct communication with the Bluetooth communication unit of the USB apparatus 100, the computer 100 recognizes the USB apparatus 100 as an USB device and the USB memory (i.e., the USB controller) receives input data of the computer 200 from the execution program 101 and converts the data into a Bluetooth format to be transmitted to the Bluetooth communication unit.

Since the USB apparatus 100 uses an USB interface and an USB HID (Human Interface Device) supported basically by an operating system (OS) such as Windows, Mackintosh, Linux or the like, it is possible to input 11 information or data into the smart phone 10 using the keyboard and/or the mouse of the computer 200 only by executing the installed program without having to install a separate device driver.

Thus, since the USB apparatus 100 is configured to have only to execute the execution program 101, the USB apparatus 100 can communicate with all OSs including Windows, Mackintosh (MAC) and Linux without having to install a separate program.

In this embodiment, it is preferable that the USB apparatus 100 incorporate all execution files for various OSs, such as a Windows execution file, a MAC execution file, a Linux execution file to be executed in their respective OSs.

In addition, since the USB apparatus 100 communicates with the smart phone 10 using the Bluetooth, there is no need to install a separate program for communication with the USB apparatus 100 in the smart phone 10.

That is, since such communication with the smart phone is conducted using basic Bluetooth keyboard/mouse functions supported by most of smart phones 10, a separate application is not required.

In this embodiment, it is more preferable that the USB apparatus 100 communicates with the smart phone 10 through a Bluetooth HID profile for smooth interlocking therebetween.

As a preferred embodiment, an operation of the input interface providing USB apparatus 100 will be now described according to its execution order.

A user of the USB apparatus 100 inserts the USB apparatus 100 in the USB port of the computer 200 irrespective of the kind of operating system.

The USB apparatus 100 is configured to communicate with the computer 200 according to an USB HID standard and the computer 200 recognizes the memory incorporated in the USB apparatus 100 as an USB memory.

To this end, it is preferable that the USB apparatus 100 includes an USB hub to allow the computer 200 to recognize the USB apparatus 100 as two devices, i.e., the memory device and an USB HID standard compliance device.

Thereafter, since the user can use the memory device in which the execution files are located in the computer 200, an execution file appropriate for a corresponding OS may be executed to allow the keyboard 400 or the mouse of the computer 200 to be used as an input means of the smart phone 10 through the executed execution program 101.

At this time, the input data of the keyboard 400 or the mouse through the execution program 101 are transmitted to the USB HID compliance device according to the USB HID standard.

Then, the input data transmitted to the USB apparatus 100 are transmitted to the smart phone 10 via the Bluetooth communication unit incorporated in the USB apparatus 100 through a conversion process.

Since the smart phone 10 recognizes the USB apparatus 100 as a basic Bluetooth keyboard or mouse, a communication protocol of the Bluetooth communication unit is accordingly configured and communication of the smart phone 10 with the USB apparatus 100 is conducted in the same way as general Bluetooth keyboard or mousse.

Accordingly, the computer 200 does not require a separate device driver for the USB apparatus 100 and the smart phone 10 using the basic Bluetooth scheme does not require a separate application.

This provides no big problem in being used for, for example, a smart phone using an iOS, such as an iPhone of Apple Inc., which basically supports a Bluetooth keyboard and a smart phone using an Android OS, such as a Galaxy S of Samsung Electronics Co. Ltd., which supports a Bluetooth HID profile.

Accordingly, the USB apparatus 100 can use the keyboard 400 and the mouse of the computer 200 due to Bluetooth-pairing with the smart phone 10.

With this configuration, the USB apparatus 100 can use the keyboard 400 or the mouse connected to the computer 200 in interlock with a variety of external devices supporting the basic Bluetooth keyboard in addition to the smart phone 10.

That is, for example, the USB apparatus 100 has an advantage that it can freely interlock with a tablet PC and a notebook PC which support Bluetooth communications.

Thus, the USB apparatus 100 has an advantage of excellent user convenience that it is connected to a USB port of a terminal (for example the computer 200) to share the input means 400 of the terminal 200 with various external devices (for example the smart phone 10) which can conduct Bluetooth communication, thereby providing an input interface for the external devices 10 without requiring an additional input means.

It is also preferable that the USB apparatus 100 communicates with the external device 10 according to the Bluetooth HID standard to allow the external device 10 to recognize the USB apparatus as a standard Bluetooth input means, thereby enabling immediate interlock with the external device 10 without installing a separate application in the external device 10, which may result in higher user convenience.

Figure 2:
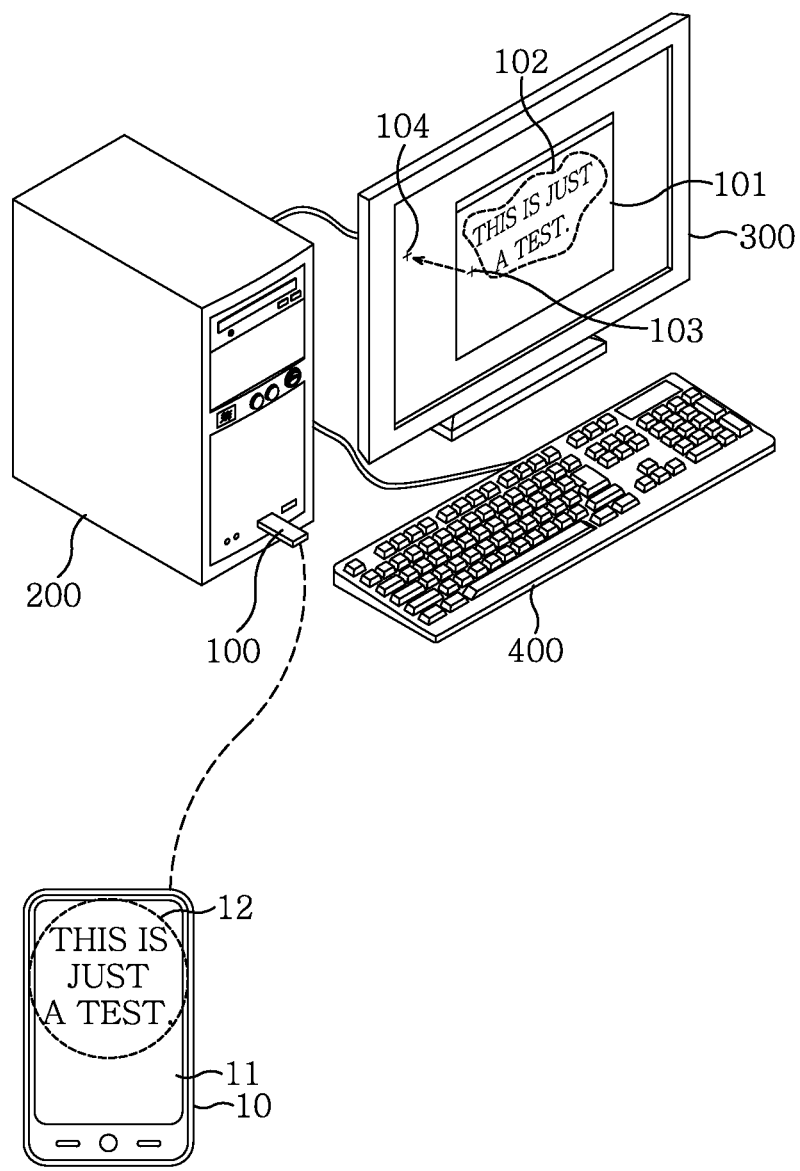
FIG. 2 is a view showing another example of the USB apparatus providing an input interface according to an embodiment of the present invention.

FIG. 2 is a view showing another example of the input interface providing USB apparatus 100 according to an embodiment of the present invention.

When an execution program is executed, a word processing program 101 is opened and the USB apparatus 100 receives contents 102 input to the word processing program 101 from the execution program and transmits 11 the contents 102 to the smart phone 10.

In this embodiment, the word processing program 101 may be either the execution program or a program set in an operating system called by the execution program.

The USB apparatus 100 can transmit 10 positions 103 and 104 of a mouse pointer, which is moving under a state where the word processing program 101 is activated, to the smart phone 10 using the execution program in real time.

In addition, when an e-mail or another document is opened and a text therein is copied and pasted into the word processing program 101, the USB apparatus 100 can transmit this text to the smart phone 10 through the execution program.

As a preferred embodiment, the execution of the execution program may open a simple window in which a position of the smart phone 10 can be selected.

A user may click on one of two left and right selection buttons. For example, when the user clicks on the left button, the user moves 104 a mouse 103 in the left of a monitor 300 if the user wishes to input contents 12 into the smart phone 10.

The moment the mouse pointer 104 is beyond a threshold located on the monitor 300, the mouse pointer 104 is displayed (not shown) on the smart phone 10 and the user can manipulate the mouse while watching the smart phone 10 lying in the left of the monitor 300 and can input the contents 12 through the keyboard 400.

When the user clicks on the right button, the moment the mouse is beyond a right threshold of the monitor, the mouse pointer is moved to the smart phone and the subsequent operation is performed in the same way as above.

It is noted that a separate application may not be installed in the smart phone 10 since the USB apparatus 100 is recognized as a basic Bluetooth keyboard or mouse of the smart phone 10.

In this way, the input interface providing USB apparatus 100 has an execution program which operates in a terminal 200 to allow input data 102 of the terminal 200 to be transmitted to the USB apparatus 100, thereby providing a simple input interface without requiring a separate driver, which may result in high device compatibility.

Figure 3:
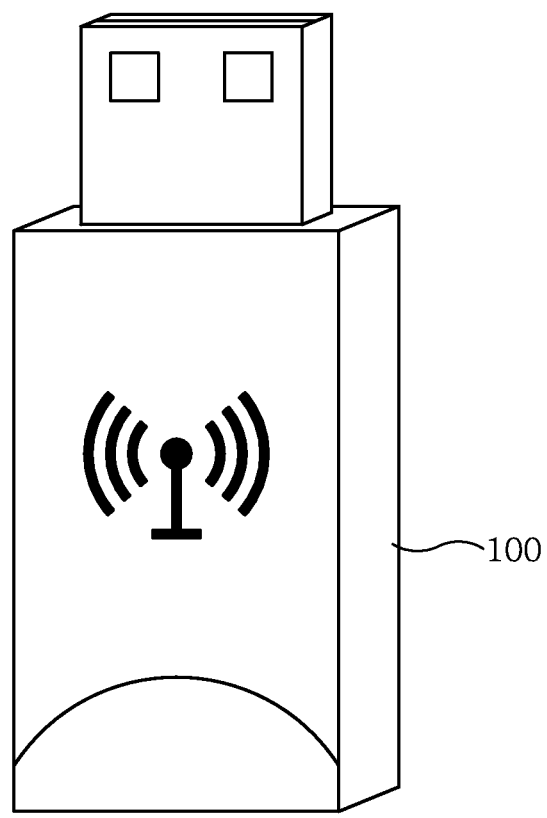
FIG. 3 is a perspective view of an USB apparatus providing an input interface according to an embodiment of the present invention.

FIG. 3 is a perspective view of the input interface providing USB apparatus 100 according to an embodiment of the present invention. As shown, it is preferable for use that the input interface providing USB apparatus 100 has a shape similar to that of a general USB storage medium or USB dongle.

Figure 4:
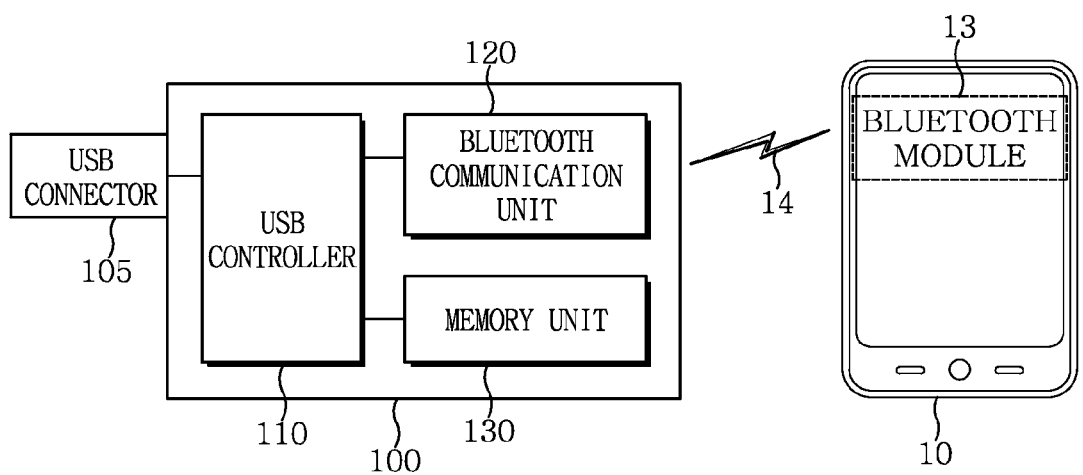
FIG. 4 is a view showing a general configuration of an USB apparatus providing an input interface according to an embodiment of the present invention.

FIG. 4 is a view showing a general configuration of the input interface providing USB apparatus 100 according to an embodiment of the present invention. As shown, the input interface providing USB apparatus 100 is an USB apparatus connected to a terminal through an USB port of the terminal using a USB connector 105 and includes a Bluetooth communication unit 120 which is recognized as a standard Bluetooth input device by an external device 10 supporting a Bluetooth device and conducts Bluetooth communication 14 with the external device 10, and an USB controller 110 which is set to comply with a HID standard, is recognized as an HID compliance device by the terminal when the USB controller 110 is connected to the USB port, receives data of an input device of the terminal corresponding to the kind of the standard Bluetooth input device through an execution program which is executed in the terminal and converts the input data into a protocol format according to the HID standard, analyzes the received input data according to a format set depending on the kind of the input device, generates data such that the analyzed input data corresponds to a protocol of the standard Bluetooth input device, and transmits the generated data to the Bluetooth communication unit 120.

In this embodiment, the execution program is preferably stored in a memory unit 130 controlled by the USB controller 110.

It is natural that the external device 10 should incorporate a Bluetooth module 13 for the Bluetooth communication 14 and it is more preferable that the external device 10 incorporates a profile to recognize the USB apparatus 100 as the basic Bluetooth input device.

The input interface providing USB apparatus 100 includes the USB controller 110 and the Bluetooth communication unit 120 which are separated from each other and provides a communication interface between the terminal and the external device 10.

That is, the USB apparatus 100 may act as an USB HID device in the terminal (the computer 200) and may act as a keyboard or a mouse in basic Bluetooth communication 14 with the external device (the smart phone 10) without requiring a separate communication driver or a smart phone dedicated application.

On the other hand, a function to support each operating system or each device to be connected and compatibility have to be considered for communication with a Bluetooth device (for example, a smart phone) through a conventional general Bluetooth dongle, thereby requiring a separate driver or a dedicated application, which results in low user convenience.

However, the input interface providing USB apparatus 100 of this embodiment provides high compatibility since it transmits contents of the computer through the most compatible interface in both devices connected to the USB apparatus 100.

That is, the input interface providing USB apparatus 100 can widely use USB HID with no problem in operating systems and device compatibility. For example, the USB apparatus 100 can be used for computers having USB ports and employing a variety of operating systems (for example Windows, Linux, Mackintosh and so on). In addition, since the USB apparatus 100 equally operates even in smart phones having different operating systems, such as iPhone or Galaxy S, the USB apparatus can be used as an input interface device irrespective of operating systems of computers and external devices if the computers have only to have USB ports.

In this way, since the USB apparatus 100 can share an input means irrespective of the kind of the terminal or the external device by separating the USB controller 110 connected to the terminal from the Bluetooth communication unit 120 communicating with the external device 10, excellent device compatibility can be provided.

Figure 5:
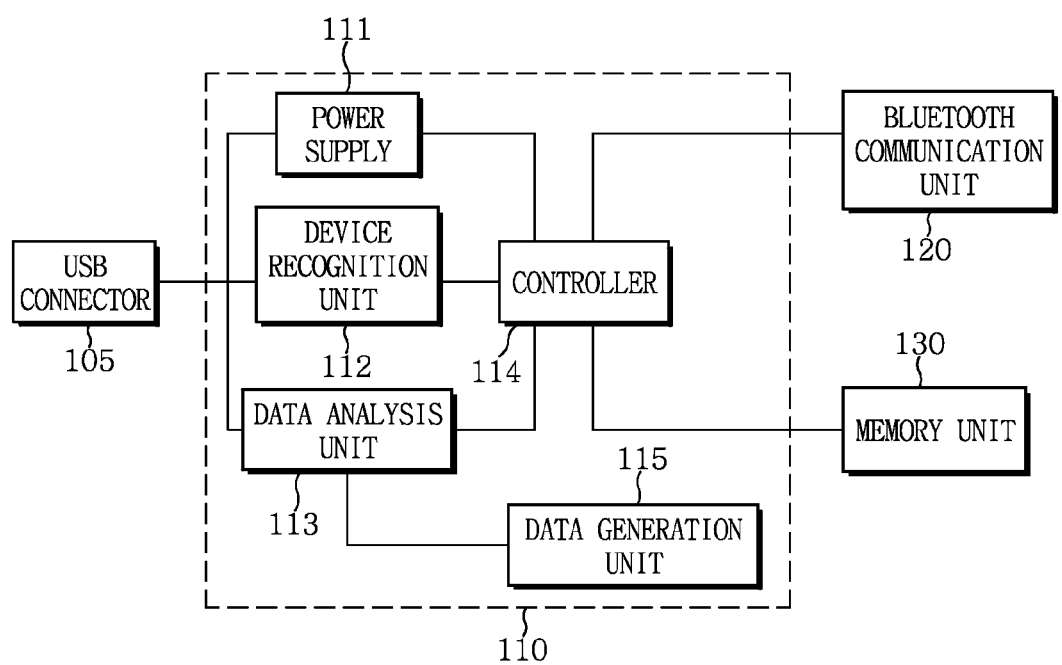
FIG. 5 is a view showing a detailed configuration of an USB apparatus providing an input interface according to a first embodiment of the present invention.

FIG. 5 is a view showing a detailed configuration of an input interface providing USB apparatus according to a first embodiment of the present invention. As shown, the input interface providing USB apparatus includes an USB connector 105 which is connected to a terminal having an USB port, a device recognition unit 112 which is set to comply with a HID standard and allows the USB apparatus to be recognized as a HID compliance device by the terminal when the USB apparatus is connected to the USB port, a Bluetooth communication unit 120 which is recognized as a standard Bluetooth input device by an external device supporting a Bluetooth device and conducts Bluetooth communication with the external device, a memory unit 130 which stores an execution program which is executed in the terminal, receives data of an input device of the terminal corresponding to the kind of the standard Bluetooth input device, converts the input data into a protocol format according to the HID standard, and transmits the converted input data to the device recognition unit, a data analysis unit 113 which analyzes the input data from the device recognition unit 112 according to a format set depending on the kind of the input device, a data generation unit 115 which generates data such that the data analyzed by the data analysis unit 113 corresponds to a protocol of the standard Bluetooth input device, and a controller 114 which transmits the data generated by the data generation unit 115 to the Bluetooth communication unit 120.

The input interface providing USB apparatus may further include a power supply 111 for power feeding.

The input interface providing USB apparatus of this embodiment complies with the USB HID standard and is connected to the USB port of the terminal so that the terminal can recognize the USB apparatus as a HID compliance device, thereby allowing the USB apparatus to be widely used for a variety of operating systems, which can result in increase in device compatibility.

It is preferable that the device recognition unit 112 complies with the HID standard and receives data having a data structure set depending on the kind of the standard Bluetooth input device from the execution program.

That is, the USB apparatus complies with only an interface standard of USB HID and arbitrarily defines and uses the data structure on the execution program without specifying the exchanged data.

For example, if the execution program is a program to be executed on a Windows-based computer, the execution program can be implemented using API provided by WinDDK of Windows under the USB HID standard.

The following Tables 1 and 2 show example of such a data structure.

TABLE 1

At Data transmission:

BOOLEAN ____stdcall
HidD__SetFeature (
____in      HANDLE    HidDeviceObject,
____in__bcount(ReportBufferLength) PVOID ReportBuffer,
____in      ULONG     ReportBufferLength   );
HidDeviceObject : Handle of HID Device Object
ReportBuffer : Start point of data to be transmitted
ReportBufferLength : Size of data to be transmitted

TABLE 2

At Data reception:

BOOLEAN ____stdcall
HidD__GetFeature (
____in       HANDLE    HidDeviceObject,
____out__bcount(ReportBufferLength) PVOID ReportBuffer,
____in       ULONG     ReportBufferLength
);
HidDeviceObject : Handle of HID Device Object
ReportBuffer : Start point of data to be transmitted
ReportBufferLength : Size of data to be transmitted The device recognition unit 112 may further include receiving mouse pointer data in the terminal from the execution program.

In addition, the device recognition unit 112 may receive copied input data from the execution program if a pointer in the terminal is beyond a preset threshold or is moved to a preset position.

In addition, it is preferable that the Bluetooth communication unit 120 is recognized as the standard Bluetooth input device by an external device supporting a Bluetooth HID device and conducts Bluetooth communication with the external device.

The memory unit 130 is implemented with a readable/writable memory to allow the execution program to be updated.

In addition, it is preferable that the memory unit 130 stores a plurality of execution programs depending on the kind of operating system of the terminal.

In addition, although not shown, the execution program may be configured to be stored in a program storage unit rather than the memory unit 130.

The external device may be any device as long as it can support Bluetooth communication. For example, the external device is preferably one of a smart phone, a tablet PC and a notebook PC. In this case, an operating system of the external device may be one of Android OS, iOS, Windows OS, Symbian OS, Blackberry OS and Bada OS.

As a preferred embodiment, the device recognition unit 112 may further include an USB hub for simultaneous recognition of the memory unit 130 and the HID compliance device in the terminal.

As another preferred embodiment, the input interface providing USB apparatus may be implemented for exclusive use of wireless Bluetooth keyboard and include a device recognition unit 112 which is set to comply with a HID standard and allows the USB apparatus to be recognized as a HID compliance device by a terminal when the USB apparatus is connected to the USB port, a Bluetooth communication unit 120 which is set as standard Bluetooth keyboard supported by the external device and conducts Bluetooth communication with the external device, a program storage unit (not shown) which stores an execution program which is executed in the terminal, receives keyboard data of the terminal, converts the keyboard data into a protocol format according to the HID standard, and transmits the converted keyboard data to the device recognition unit 112, a data analysis unit 113 which analyzes the keyboard data from the device recognition unit 112 according to a set format, a data generation unit 115 which generates data such that the data analyzed by the data analysis unit 113 corresponds to a protocol of the standard Bluetooth keyboard, and a controller 114 which transmits the data generated by the data generation unit 115 to the Bluetooth communication unit 120.

Figure 6:
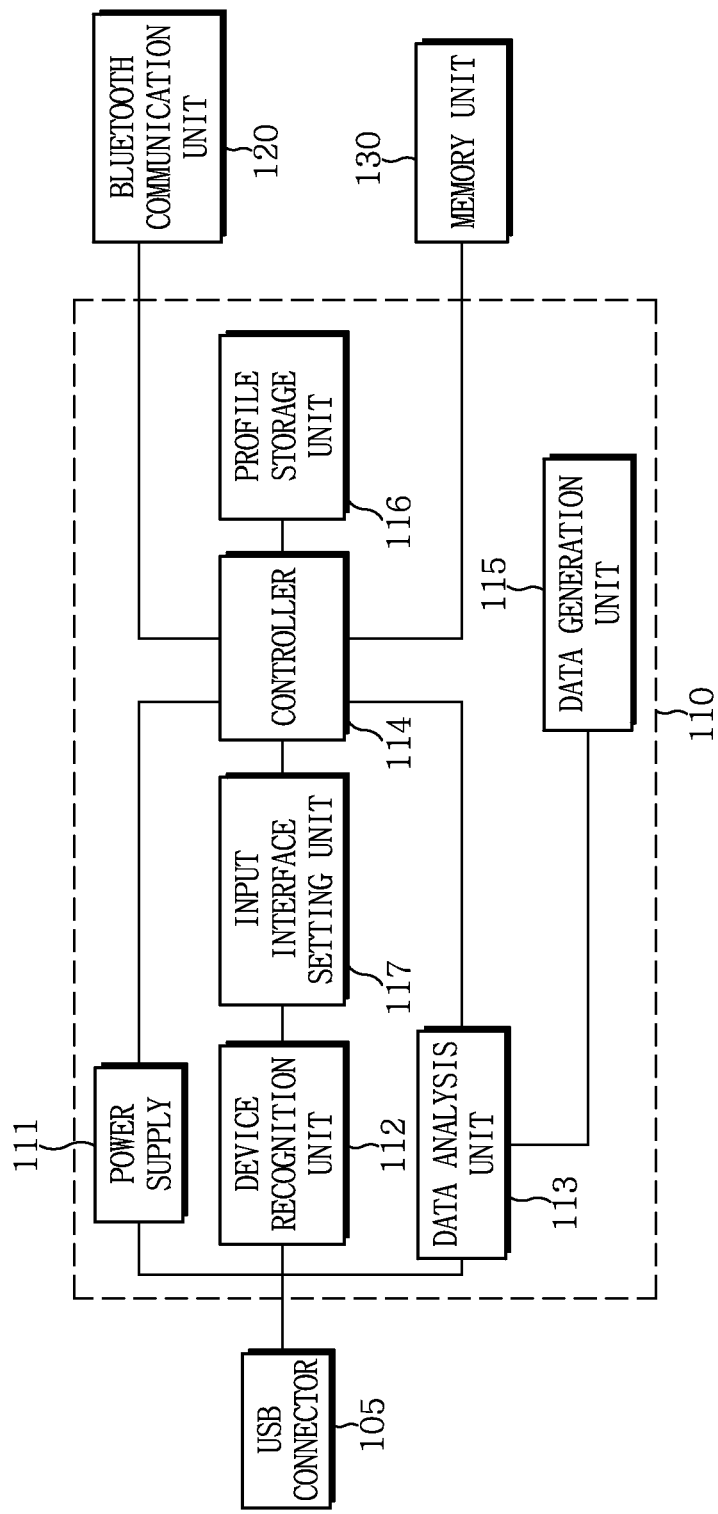
FIG. 6 is a view showing a detailed configuration of an USB apparatus providing an input interface according to a second embodiment of the present invention.

FIG. 6 is a view showing a detailed configuration of an input interface providing USB apparatus according to a second embodiment of the present invention. As shown, the input interface providing USB apparatus includes an USB connector 105 which is connected to a terminal having an USB port, a device recognition unit 112 which is set to comply with a HID standard and allows the USB apparatus to be recognized as a HID compliance device by the terminal when the USB apparatus is connected to the USB port, a memory unit 130 which stores an execution program which is executed in the terminal, receives the kind of an input device of the terminal, receives input data corresponding to the input device, converts the received input data into a standard protocol format according to the HID standard, and transmits the converted input data to the device recognition unit 112, a profile storage unit 116 which stores Bluetooth profiles for one or more Bluetooth input devices of one or more external devices supporting a Bluetooth device, a Bluetooth communication unit 120 which selects a Bluetooth profile corresponding to the input device from the Bluetooth profiles corresponding to the external devices and conducts Bluetooth communication with the external device, a data analysis unit 113 which analyzes the input data from the device recognition unit 112 according to a format set depending on the kind of the set input device, a data generation unit 115 which generates data such that the data analyzed by the data analysis unit 113 corresponds to a protocol of the selected Bluetooth profile, and a controller 114 which transmits the data generated by the data generation unit 115 to the Bluetooth communication unit 120.

Since the input interface providing USB apparatus uses a HID driver, the USB apparatus may be recognized by the external device substantially paired with Bluetooth without be specified by the terminal.

Accordingly, the USB apparatus may be changed to a device (for example a Bluetooth keyboard, a mouse, a file forwarder or other device) supporting one of input devices connected to the terminal for the external device as set in the execution program.

Since such change can be made in use as well as during manufacture, various applications adapted for a purpose are possible by changing and manufacturing the Bluetooth profile and the execution program depending on usage.

In this way, the USB apparatus change the kind of an input interface by only change of set-up of the kind of input means or change of set-up of Bluetooth communication profiles through the above-described separation configuration and accordingly can interface basic input means such a keyboard and a mouse and other input means such as a pen, a digitizer and so on.

In addition, the profile storage unit 116 may add, delete and update the Bluetooth profiles and the memory unit 130 may add, delete and update the execution program.

As another preferred embodiment, the USB apparatus having such scalability may include an USB connector 105 which is connected to a terminal having an USB port, a device recognition unit 112 which is set to comply with a HID standard and allows the USB apparatus to be recognized as a HID compliance device by the terminal when the USB apparatus is connected to the USB port, a profile storage unit 116 which stores Bluetooth profiles for one or more Bluetooth input devices of one or more external devices supporting a Bluetooth device, a Bluetooth communication unit 120 which selects a Bluetooth profile corresponding to the input device from the Bluetooth profiles corresponding to the external devices and conducts Bluetooth communication with the external device, an input interface setting unit 117 which sets the kind of an input device corresponding to the selected Bluetooth profile, a memory unit 130 which stores an execution program which is executed in the terminal, receives data of an input device of the terminal corresponding to the kind of the input device, converts the input data into a standard protocol format according to the HID standard, and transmits the converted input data to the device recognition unit 112, a data analysis unit 113 which analyzes the input data from the device recognition unit 112 according to a format set depending on the kind of the set input device, a data generation unit 115 which generates data such that the data analyzed by the data analysis unit 113 corresponds to a protocol of the selected Bluetooth profile, and a controller 114 which transmits the data generated by the data generation unit 115 to the Bluetooth communication unit 120.

The USB apparatus incorporates supportable Bluetooth profiles and a user may select one of the Bluetooth profiles to be used as an input interface for a corresponding input device.

In this embodiment, the input interface setting unit 117 may be preferably implemented by hardware but may be implemented by software.

It is noted that the two embodiments shown and described in FIG. 6 are different in means for setting the kind of the input device but have the same essential elements.

Figure 7:
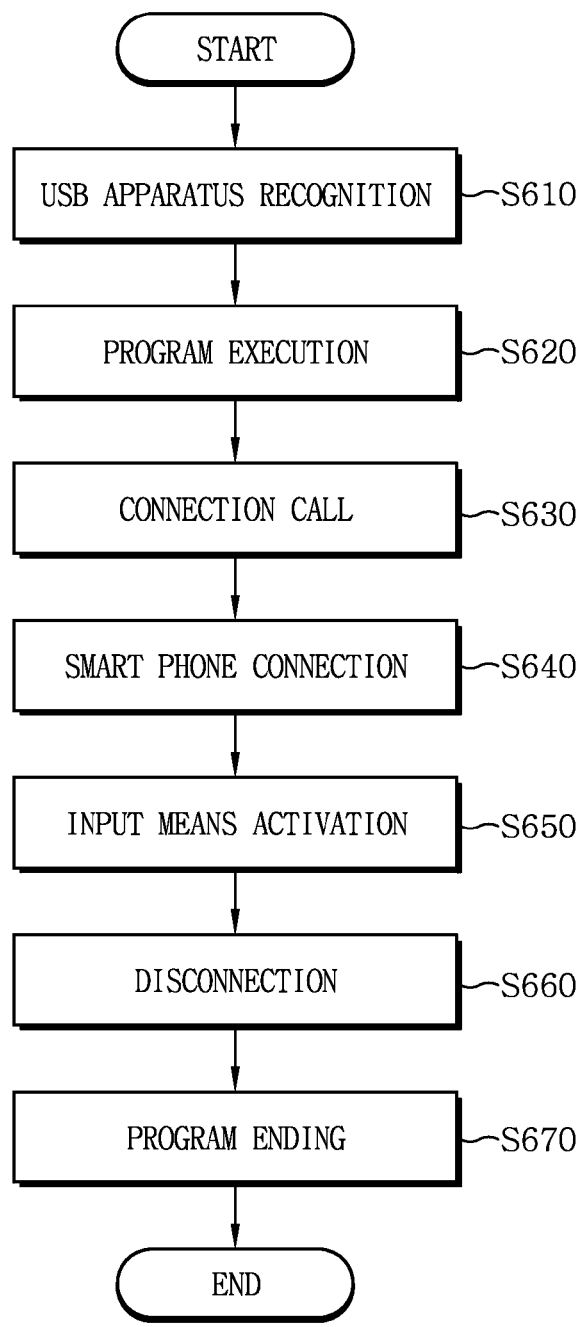
FIG. 7 is a flow chart of an input interface providing method according to an embodiment of the present invention.
Figure 8:
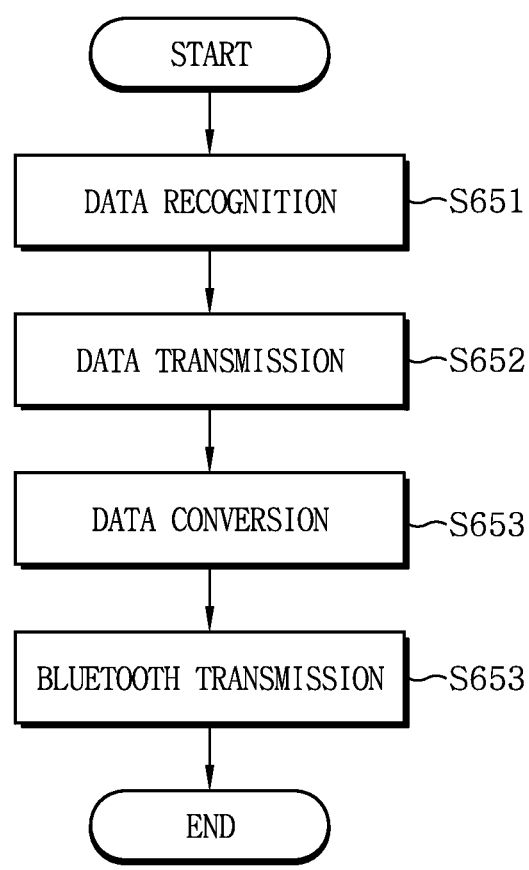
FIG. 8 is a flow chart showing an operation of an input means according to an embodiment of the present invention.

FIG. 7 is a flow chart of an input interface providing method according to an embodiment of the present invention, and FIG. 8 is a flow chart showing an operation of an input means according to an embodiment of the present invention.

Referring to FIGS. 7 and 8, an input interface providing method of an USB apparatus connected to a terminal via an USB port according to an embodiment of the present invention includes the steps of: setting the USB apparatus to comply with a HID standard and allowing the USB apparatus to be recognized as a HID compliance device by the terminal when the USB apparatus is connected to the USB port (S710); by the USB apparatus driving an execution program to be executed in the terminal (S720); recognizing the USB apparatus as a standard Bluetooth input device by an external device supporting a Bluetooth device (S730) and by the USB apparatus conducting Bluetooth communication with the external device (S740); by the USB apparatus receiving data of an input device of the terminal corresponding to the kind of the standard Bluetooth input device, with the input data being converted into a protocol format according to the HID standard, from the execution program (S751 and S752); by the USE apparatus analyzing the input data according to a format set depending on the kind of the input device (S753); by the USB apparatus generating data such that the analyzed data corresponds to a protocol of the standard Bluetooth input device (S753); and by the USB apparatus transmitting the generated data to the external device (S754).

The input interface providing method may further include the steps of: disconnecting the USB apparatus from the external device (S760); and by the USB apparatus ending the execution program (S770).

As another preferred embodiment, the input interface providing method includes the steps of: setting the USB apparatus to comply with a HID standard and allowing the USB apparatus to be recognized as a HID compliance device by the terminal when the USB apparatus is connected to the USB port (S710); by the USB apparatus driving an execution program to be executed in the terminal and receiving the kind of input device of the terminal from the execution program (S720); by the USB apparatus selecting a Bluetooth profile corresponding to the kind of the input device from pre-stored Bluetooth profiles and conducting Bluetooth communication with the external device (S730 and S740); by the USB apparatus receiving data of an input device of the terminal corresponding to the kind of the input device, with the input data being converted into a protocol format according to the HID standard, from the execution program (S751 and S752); by the USB apparatus analyzing the input data according to a format set depending on the kind of the input device (S753); by the USB apparatus generating data such that the analyzed data corresponds to a protocol of the standard Bluetooth input device (S753); and by the USB apparatus transmitting the generated data to the external device (S754).

While the present invention has been particularly shown and described with reference to exemplary embodiments thereof, it will be understood by those skilled in the art that various changes in form and details may be made therein without departing from the spirit and scope of the present invention. The exemplary embodiments are provided for the purpose of illustrating the invention, not in a limitative sense. Thus, it is intended that the present invention covers the modifications and variations of this invention provided they come within the scope of the appended claims and their equivalents.

What is claimed is:

1. An input interface providing Universal Serial Bus (USB) apparatus comprising:
   an USB connector which is connected to a terminal having an USB port and an input device;
   a device recognition unit which is set to comply with a HID standard and allows the USB apparatus to be recognized as a Human Interface Device (HID) compliance device by the terminal when the USB apparatus is connected to the USB port;
   a Bluetooth communication unit which is recognized as a standard Bluetooth input device by an external device supporting a Bluetooth device and conducts Bluetooth communication with the external device;
   a memory unit which stores an execution program which is executed in the terminal, receives data of an input device of the terminal corresponding to the kind of the standard Bluetooth input device, converts the input data into a protocol format according to the HID standard, and transmits the converted input data to the device recognition unit;
   a data generation unit which receives input device data in the format of HID standard protocol from the device recognition unit, analyzes the input device data according to a format set depending on the kind of the input device, and generates data such that the analyzed data corresponds to a protocol of the standard Bluetooth input device;
   a controller which transmits the data generated by the data generation unit to the Bluetooth communication unit; and
   a profile storage unit which stores Bluetooth profiles for Bluetooth input devices of the external device so that the Bluetooth communication unit can be recognized as the standard Bluetooth input device by the external device.

2. The input interface providing USB apparatus according to claim 1, wherein the device recognition unit complies with the HID standard and receives data having a data structure set depending on the kind of the standard Bluetooth input device from the execution program.

3. The input interface providing USB apparatus according to claim 1, wherein the Bluetooth communication unit is recognized as a standard Bluetooth HID input device by an external device supporting a Bluetooth HID device and conducts Bluetooth communication with the external device.

4. The input interface providing USB apparatus according to claim 1, wherein the device recognition unit provides an input interface further including receiving mouse pointer data in the terminal from the execution program.

5. The input interface providing USB apparatus according to claim 1, wherein the device recognition unit receives copied input data from the execution program if a pointer in the terminal is beyond a preset threshold or is moved to a preset position.

6. The input interface providing USB apparatus according to claim 1, wherein the memory unit is implemented with a readable/writable memory to allow the execution program to be updated.

7. The input interface providing USB apparatus according to claim 1, wherein the memory unit stores a plurality of execution programs depending on the kind of operating system of the terminal.

8. The input interface providing USB apparatus according to claim 1, wherein the external device is one of a smart phone, a tablet PC and a notebook PC and an operating system of the external device is one of Android OS, iOS, Windows OS, Symbian OS, Blackberry OS and Bada OS.

9. The input interface providing USB apparatus according to claim 1, wherein the device recognition unit further includes an USB hub for simultaneous recognition of the memory unit and the HID compliance device in the terminal.

10. An input interface providing USB apparatus connected to a terminal via an USB port, comprising:
    a Bluetooth communication unit which is recognized as a standard Bluetooth input device by an external device supporting a Bluetooth device and conducts Bluetooth communication with the external device; and
    an USB controller which is set to comply with a HID standard, is recognized as an HID compliance device by the terminal when the USB controller is connected to the USB port, receives data of an input device of the terminal corresponding to the kind of the standard Bluetooth input device through an execution program which is executed in the terminal and converts the input data into a protocol format according to the HID standard, analyzes the received input data according to a format set depending on the kind of the input device, generates data such that the analyzed input data corresponds to a protocol of the standard Bluetooth input device, and transmits the generated data to the Bluetooth communication unit.

11. An input interface providing USB apparatus connected to a terminal via an USB port, comprising:
    a device recognition unit which is set to comply with a HID standard and allows the USB apparatus to be recognized as a HID compliance device by a terminal when the USB apparatus is connected to the USB port;

a Bluetooth communication unit which is recognized as a standard Bluetooth keyboard by an external device and conducts Bluetooth communication with the external device;

a program storage unit which stores an execution program which is executed in the terminal, receives keyboard data of the terminal, converts the keyboard data into a protocol format according to the HID standard, and transmits the converted keyboard data to the device recognition unit;

a data analysis unit which analyzes the keyboard data from the device recognition unit according to a set format;

a data generation unit which generates data such that the data analyzed by the data analysis unit corresponds to a protocol of the standard Bluetooth keyboard; and a controller which transmits the data generated by the data generation unit to the Bluetooth communication unit.

12. An input interface providing USB apparatus comprising:

an USB connector which is connected to a terminal having an USB port and an input device;

a device recognition unit which is set to comply with a HID standard and allows the USB apparatus to be recognized as a HID compliance device by the terminal when the USB apparatus is connected to the USB port;

a memory unit which stores an execution program which is executed in the terminal, receives the kind of an input device of the terminal, receives input data corresponding to the input device, converts the received input data into a standard protocol format according to the HID standard, and transmits the converted input data to the device recognition unit;

a profile storage unit which stores Bluetooth profiles for one or more Bluetooth input devices of one or more external devices supporting a Bluetooth device;

a Bluetooth communication unit which selects a Bluetooth profile corresponding to the input device from the Bluetooth profiles and conducts Bluetooth communication with the external device while causing the external device to be recognized as the selected Bluetooth input device;

a data analysis unit which analyzes the input data from the device recognition unit according to a format set depending on the kind of the set input device;

a data generation unit which generates data such that the data analyzed by the data analysis unit corresponds to a protocol of the selected Bluetooth profile; and a controller which transmits the data generated by the data generation unit to the Bluetooth communication unit.

13. The input interface providing USB apparatus according to claim 12, wherein the profile storage unit may add, delete and update the Bluetooth profiles and the memory unit may add, delete and update the execution program.

14. An input interface providing USB apparatus comprising:

an USB connector which is connected to a terminal having an USB port and an input device;

a device recognition unit which is set to comply with a HID standard and allows the USB apparatus to be recognized as a HID compliance device by the terminal when the USB apparatus is connected to the USB port;

a profile storage unit which stores Bluetooth profiles for one or more Bluetooth input devices of one or more external devices supporting a Bluetooth device;

a Bluetooth communication unit which selects one of the Bluetooth profiles and conducts Bluetooth communication with the external device after the external device is recognized as the selected Bluetooth input device;

an input interface setting unit which sets the kind of the Bluetooth input device and designates a Bluetooth profile to be selected by the Bluetooth communication unit;

a memory unit which stores an execution program which is executed in the terminal, receives data of an input device of the terminal corresponding to the kind of the input device, converts the input data into a standard protocol format according to the HID standard, and transmits the converted input data to the device recognition unit;

a data analysis unit which analyzes the input data from the device recognition unit according to a format set depending on the kind of the set input device;

a data generation unit which generates data such that the data analyzed by the data analysis unit corresponds to a protocol of the selected Bluetooth profile; and a controller which transmits the data generated by the data generation unit to the Bluetooth communication unit.

15. An input interface providing method of an USB apparatus connected to a terminal via an USB port, comprising the steps of:

a) setting the USB apparatus to comply with a HID standard and allowing the USB apparatus to be recognized as a HID compliance device by the terminal when the USB apparatus is connected to the USB port;

b) by the USB apparatus driving an execution program to be executed in the terminal;

c) recognizing the USB apparatus as a standard Bluetooth input device by an external device supporting a Bluetooth device and by the USB apparatus conducting Bluetooth communication with the external device;

d) by the USB apparatus receiving data of an input device of the terminal corresponding to the kind of the standard Bluetooth input device, with the input data being converted into a protocol format according to the HID standard, from the execution program;

e) by the USB apparatus analyzing the input data according to a format set depending on the kind of the input device;

f) by the USB apparatus generating data such that the analyzed data corresponds to a protocol of the standard Bluetooth input device; and g) by the USB apparatus transmitting the generated data to the external device.

16. An input interface providing method of an USB apparatus connected to a terminal via an USB port, comprising the steps of:

a) setting the USB apparatus to comply with a HID standard and allowing the USB apparatus to be recognized as a HID compliance device by the terminal when the USB apparatus is connected to the USB port;

b) by the USB apparatus driving an execution program to be executed in the terminal and receiving the kind of input device of the terminal from the execution program;

c) by the USB apparatus selecting a Bluetooth profile corresponding to the kind of the input device from pre-stored Bluetooth profiles and conducting Bluetooth communication with the external device while causing an external device to be recognized as the selected Bluetooth input device;

d) by the USB apparatus receiving data of an input device of the terminal corresponding to the kind of the input device, with the input data being converted into a protocol format according to the HID standard, from the execution program;

e) by the USB apparatus analyzing the input data according to a format set depending on the kind of the input device;

f) by the USB apparatus generating data such that the analyzed data corresponds to a protocol of the standard Bluetooth input device; and
g) by the USB apparatus transmitting the generated data to the external device.

* * * * *